Aug. 18, 1931.     A. GALANTI     1,819,677
TRANSMISSION MECHANISM
Filed Sept. 4, 1929     4 Sheets-Sheet 3
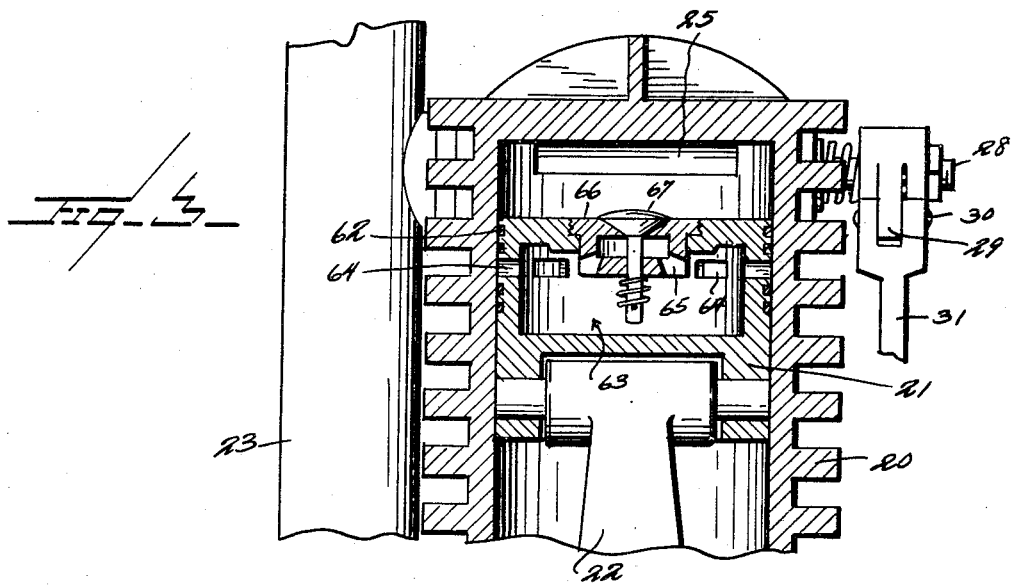
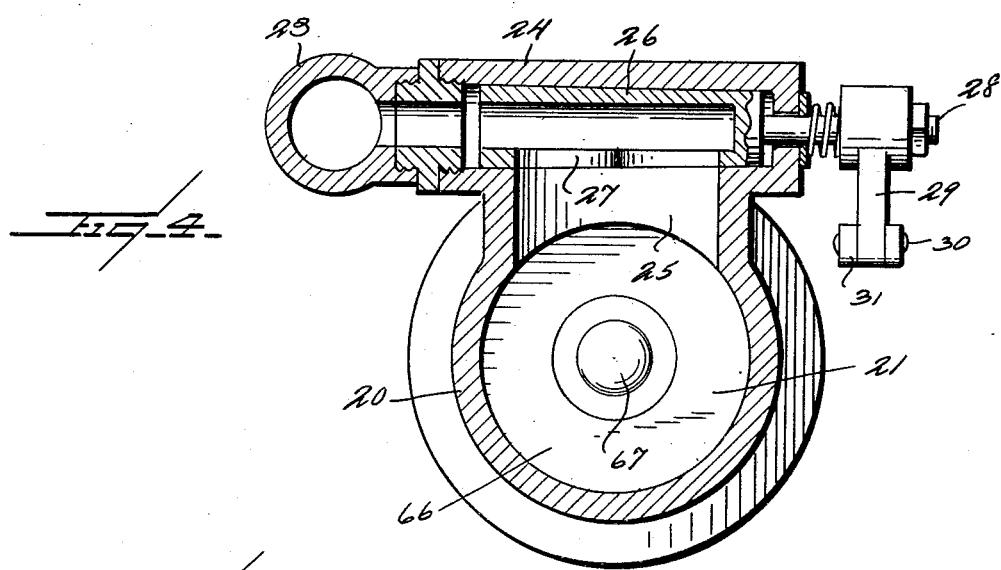
Inventor
A. Galanti
By Watson E. Coleman
Attorney Aug. 18, 1931.   A. GALANTI   1,819,677
TRANSMISSION MECHANISM
Filed Sept. 4, 1929    4 Sheets-Sheet 4

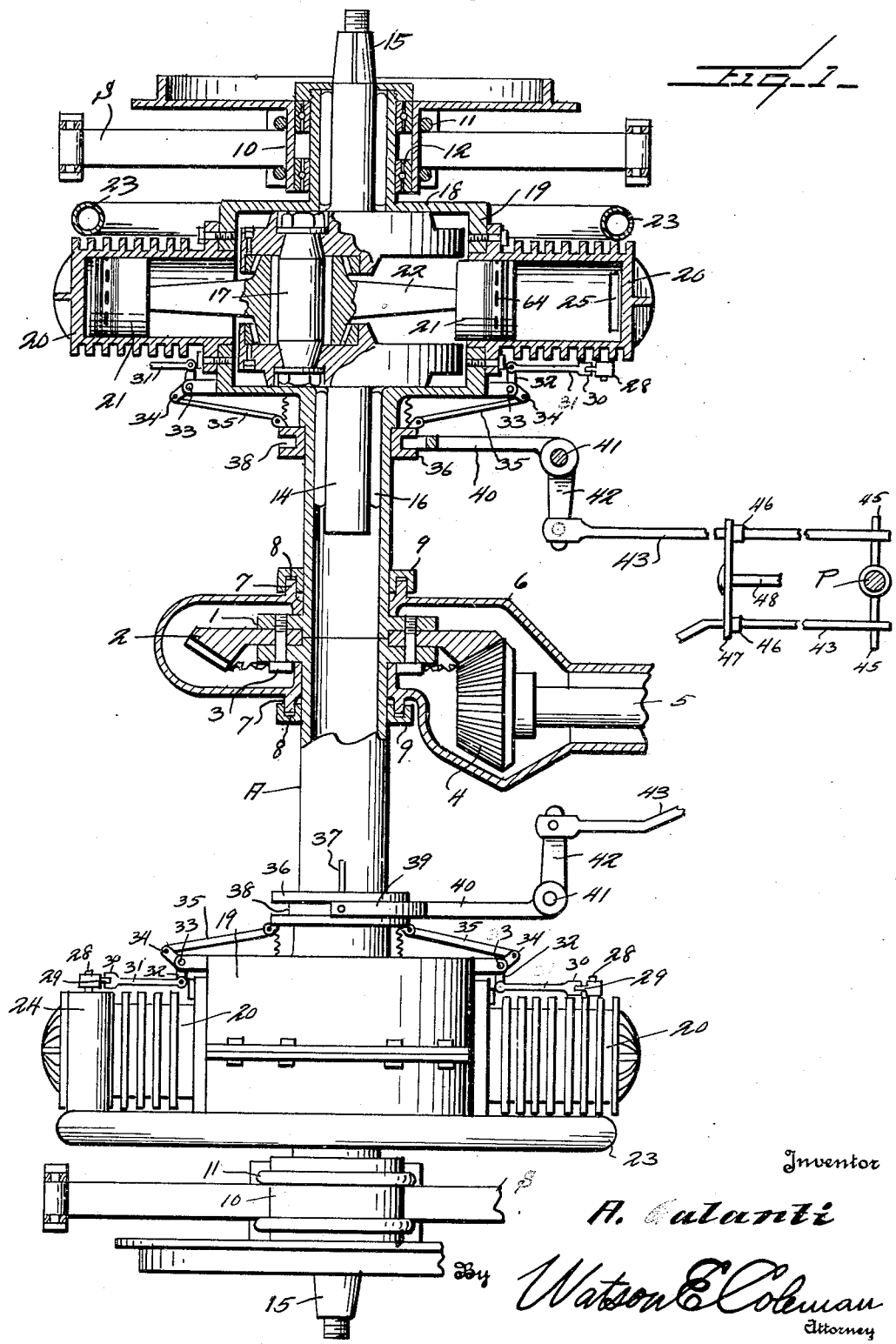

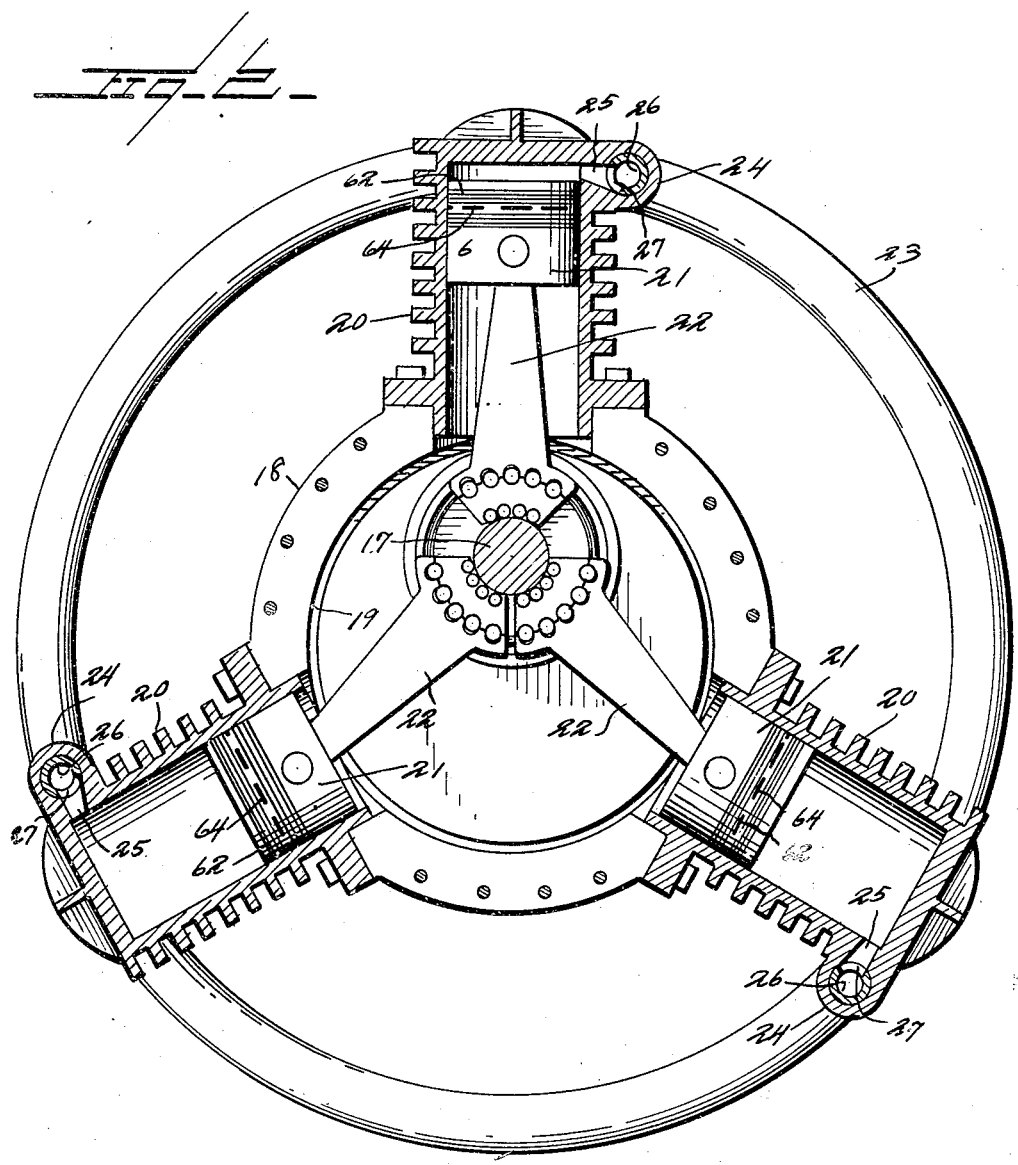

Inventor
A. Galanti
By Watson E. Coleman
Attorney

Patented Aug. 18, 1931

1,819,677

UNITED STATES PATENT OFFICE

AMILCARE GALANTI, OF PHILADELPHIA, PENNSYLVANIA

TRANSMISSION MECHANISM

Application filed September 4, 1929. Serial No. 390,340.

This invention relates to a transmission mechanism and has relation more particularly to a mechanism of this kind of a hydraulic type, and primarily it is an object of the invention to provide a mechanism of this character which dispenses with the use of shifting gears and which is under control of a single lever to effect a desired speed from zero to maximum.

Another object of the invention is to provide a mechanism of this kind particularly designed and adapted for use in connection with motor driven vehicles and which avoids the use of a clutch and which operates to substantially eliminate all vibration in changing the speed and with a resultant saving in fuel.

A further object of the invention is to provide a mechanism of this kind including means under control of the steering mechanism of the vehicle to assure requisite differential action of the driving wheels.

The invention consists in the details of construction and in the combination and arrangement of the several parts of my improved transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in top plan and partly in section and of somewhat a diagrammatic character illustrating a transmission mechanism constructed in accordance with an embodiment of my invention;

Figure 2 is an enlarged vertical sectional view illustrating one series of cylinders and pistons and the parts concomitant thereto;

Figure 3 is an enlarged view partly in section and partly in elevation illustrating in detail the construction of each of the pistons as herein embodied;

Figure 4 is a fragmentary sectional view on an enlarged scale illustrating the valve structure coacting with each of the cylinders;

Figure 5 is a view in plan of a valve member unapplied;

Figure 6 is a fragmentary view partly in side elevation and partly in section illustrating the means herein disclosed for effecting the desired operation of the valves;

Figure 8:
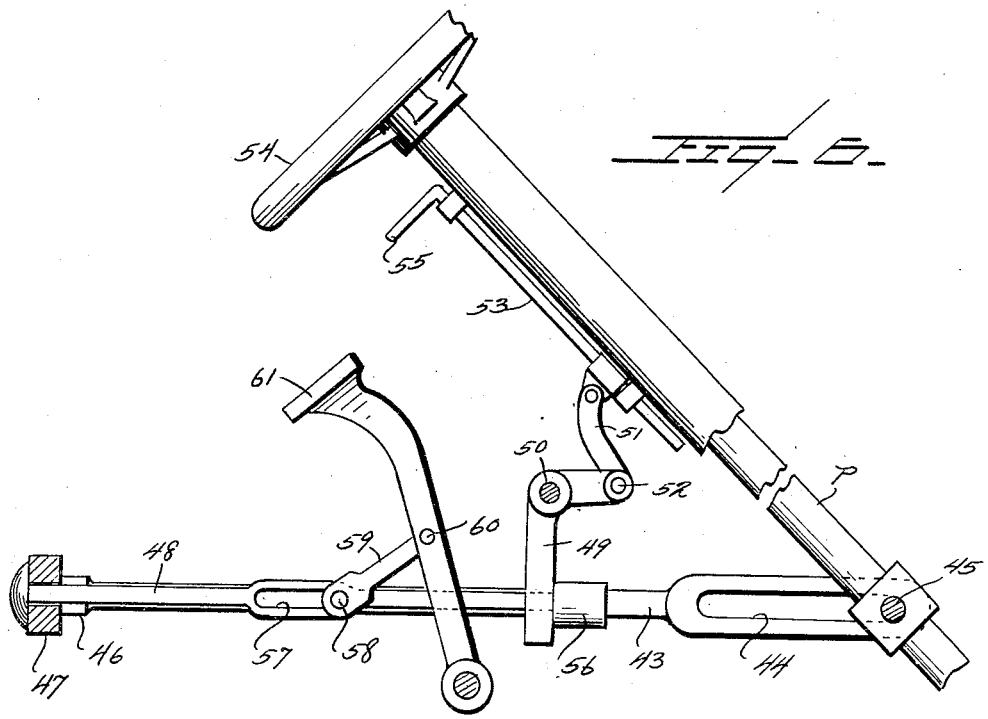
Figure 7:
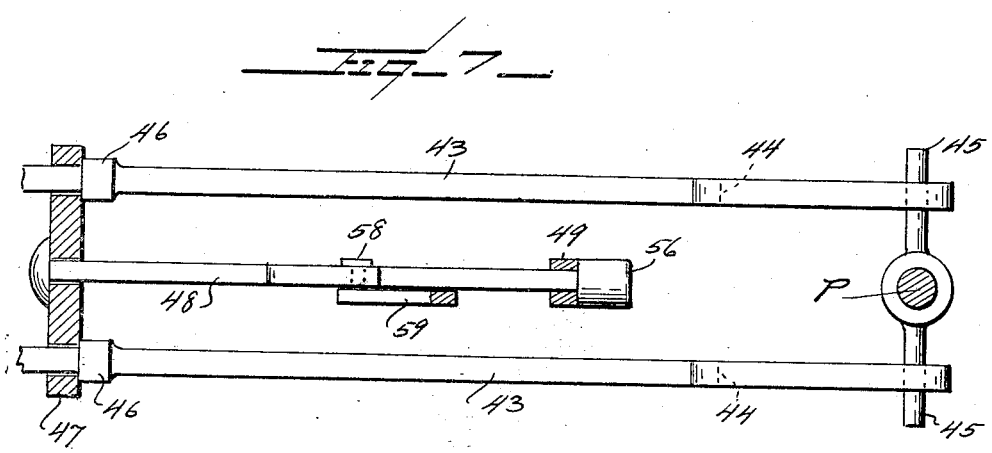
Figure 7 is a view partly in section and partly in top plan of the structure illustrated in Figure 6.

As disclosed in the accompanying drawings, A denotes an elongated tubular member of desired length and which, as disclosed, is formed of two sections, the inner ends of which being adapted to abut when the sections are in assembly. The sections of the member A closely adjacent to their inner ends are provided with the outstanding annular flanges 1 which are adapted to receive therebetween the central portion of a gear 2, said gear being fixed or locked in working position by the bolts 3 which are disposed through the flanges 1 and the central portion of the gear 2, said bolts also serving to hold the inner portions of the sections of the member A in assembled relation.

The gear 2 constantly meshes with a gear 4 fixed to a propeller shaft 5, said gears 2 and 4 being contained within a housing 6.

The member A is snugly and freely disposed through the housing 6, the side walls of which having outstanding annular flanges 7 engaged within the grooves or channels 8 provided in the opposed faces of the cuffs or rings 9 fixed to and surrounding the inner or adjacent end portions of the sections of the member A.

The outer end portion of each of the sections of the member A is rotatably engaged within a bearing housing 10 and clamped, as at 11, or otherwise fixedly attached to a suspension spring S. Associated with the bearing housing 10 and the coacting outer end portion of a section of the member A are suitable anti-friction means, as indicated at 12.

Extending within the opposite ends of the member A are the elongated shaft sections 14, the outer end portion of each of which being extended or projected to provide a spindle 15 upon which a ground engaging driving wheel is adapted to be fixed.

Each of the shaft sections 14 is supported within the member A through the medium of the anti-friction means 16 for rotation independently of the member A. Each of the shaft sections 14 intermediate its ends is provided with a crank 17 which operates in a casing 18 provided by suitably enlarging a portion of a section of the member A.

Radiating from the peripheral wall 19 of the casing 18 are a plurality of cylinders 20, herein disclosed as three in number and equidistantly spaced in a direction circumferentially of the casing 18. The outer ends of the cylinders 20 are closed while the inner ends are open for communication with the interior of the casing 18.

Reciprocating in the cylinders 20 are the pistons 21 with which are operatively engaged the pitmen 22 which in turn are in operative engagement with the crank 17 so that the associated shaft 14 will be caused to rotate with the member A in accordance with the resistance offered to the reciprocation of the pistons 21 within the cylinders 20. With the pistons 21 held against reciprocation with respect to the cylinders 20, the shaft 14 will rotate at the same axial speed as the member A and as such resistance to the pistons 21 is lessened, the shaft 14 will rotate with respect to the member A at a corresponding lower speed.

Arranged to one side of the cylinders 20 carried by each section of the member A is an annular continuous pipe line 23 of desired bore and which is in communication with the elongated valve casings 24 formed with and arranged exteriorly of the cylinders 20 immediately adjacent to the outer ends thereof. These casings 24 are disposed in a direction substantially at right angles to the annular pipe line 23.

Each of the valve casings 24 is in communication with the adjacent cylinder 20 at a point closely adjacent to the outer closed end thereof through a port 25.

Rotatably mounted within each of the valve casings 24 is a tubular valve 26 having one end open to assure requisite communication with the pipe line 23 while the opposite end portion is closed. This tubular valve member in its wall is provided with an elongated port 27 increased in width as desired towards its center so that upon requisite rotation of the valve member 26 the flow of the desired fluid, preferably mercury, may be regulated or controlled in accordance with the speed desired.

In the present embodiment of my invention, the closed end of the valve member 26 is provided with an outstanding extension 28 carrying a rock arm 29. Operatively engaged, as at 30, with the rock arm 29 is an end portion of a rigid link 31 which in turn is operatively engaged with an end portion of a bell crank lever 32. The heel portion of this lever 32 is mounted, as at 33, for desired rocking movement upon the casing 18. The opposite end portion of the bell crank lever has operatively engaged therewith, as at 34, a second rigid link 35 which in turn is operatively engaged with an annular member 36 surrounding the member A inwardly of the casing 18 but in relatively close proximity thereto. As indicated at 37, the collar 36 is keyed to the member A for rotation therewith and for movement lengthwise thereof.

As the collar 36 is moved lengthwise of the member A the valves 26 in unison will be rotated or adjusted as desired from full open position to full closed position or any intermediate adjustment as determined by the speed desired.

As herein disclosed, each of the collars 36 is provided in its periphery with a continuous groove or channel 38 in which are received the arms 39 of a substantially U-shaped fork. The outer portion of the stem 40 of the fork is supported upon a desired part of the vehicle, as at 41, for rocking or swinging movement and said pivoted end portion of the stem 40 is provided with an angularly disposed arm 42 which has its outer portion operatively connected with an end portion of an elongated and forwardly disposed rod 43. The rod 43 is of a length to terminate closely adjacent to the steering post P and said forward portion is provided with an elongated slot 44 through which is projected an arm 45 fixed to said post.

As clearly disclosed in the accompanying drawings, the rods 43 associated with the two sets of cylinders are positioned at opposite sides of the steering post P, and when the vehicle is traveling straight ahead the arms 42 are closely adjacent to the forward ends of the slots 44. In turning the post to effect the desired steering operation, the arm 45 swinging forwardly will impose pull on the coacting rod 43 so that the valve members 26 for controlling the rotation of one of the driving wheels will be adjusted to permit such wheel to have requisite differential rotation. During this operation the second arm 45 will have unhindered or unobstructed rearward movement within a slot 44 of the second rod 43.

At a desired distance inwardly of the slots 44, the rods 43 are provided with the enlargements or heads 46 which, when the vehicle is traveling straight ahead, are substantially in transverse alignment.

The rods 43 inwardly of these enlargements or heads 46 are freely disposed through the end portions of a cross member 47 which is adapted normally to have contact with said heads or enlargements 46. Midway its ends this cross member 47 has secured thereto an end portion of a forwardly directed rod 48. The forward extremity of this rod 48 is freely disposed through an arm 49 of a bell crank lever. This bell crank lever has its heel portion pivotally engaged, as at 50, upon a suitable part of the vehicle and the second arm 51 is operatively connected, as at 52, with a shaft 53 extending lengthwise of the post P. This shaft 53 adjacent to the hand wheel 54 for the post P is provided with an operating lever 55.

The arm 49 of the bell crank lever upon forward swinging movement has contact with an enlargement or head 56 carried by the rod 48 so that upon requisite rocking or rotation of the shaft 53, pull will be imposed upon the cross member 47 with a resultant pull on both of the rods 43 whereby the valves associated with both sets of cylinders 20 will be operated in unison and to the same extent, thus resulting in the desired regulation of the speed of the shafts 14.

The rod 48 at a desired point intermediate its ends is provided with a longitudinally disposed slot 57 in which engages a part 58 carried by a rigid link 59. This link 59 is pivotally connected, as at 60, with a pedal 61. The slot 57 is of a length to permit the rod 48 to be operated by the arm 49 of the bell crank lever without hinderance or obstruction being offered by the rigid link 59. As is believed to be obvious, when desired, the speed of the shafts 14 may be regulated or controlled upon operation of the pedal 61 as forward movement of such pedal will result in relative forward movement of the rod 48.

It is to be understood that the pipe lines 23 together with the cylinders 20 in advance of the pistons 21 are filled with a desired fluid, preferably mercury, and that the desired speed of the shafts 14 from zero to maximum is dependent upon the resistance offered by such fluid to the pistons 21 as determined by the adjustment of the valve members 26.

In the operation of my improved mechanism, it is to be expected that there will be a certain amount of leakage pass the pistons 21 and more especially the first two packing rings 62. I, therefore, find it of advantage to provide the outer or working end portion of each of the pistons 21 with a chamber 63 having in its peripheral wall inwardly of the first two packing rings 62 the ports 64. The fluid passing these first two outer rings 62 will enter the chamber 63 through these ports 64 during the period of compression of the piston. During the period of aspiration, the fluid will pass from the chamber 63 into the cylinder 20 in advance of the piston 21 through the port 65 provided in the outer head 66 of the piston. This port 65 is normally closed by the outwardly moving valve member 67.

From the foregoing description it is thought to be obvious that a transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A hydraulic transmission mechanism comprising a tubular member, means for supporting the same for rotation, a driving means therefor, shafts extending within said tubular member through opposite ends thereof, said tubular member at a point intermediate the ends of each of the shafts being provided with a surrounding casing, cylinders radiating from said casing, pistons working in the cylinders, operative connections between the pistons and the shaft, a continuous pipe line in communication with each of the cylinders in advance of the pistons, a valve controlling the communication between each cylinder and the continuous pipe line, and means for adjusting said valves in unison.

2. A hydraulic transmission mechanism comprising a tubular member, means for supporting the same for rotation, a driving means therefor, shafts extending within said tubular member through opposite ends thereof, said tubular member at a point intermediate the ends of each of the shafts being provided with a surrounding casing, cylinders radiating from said casing, pistons working in the cylinders, operative connections between the pistons and the shaft, a continuous pipe line in communication with each of the cylinders in advance of the pistons, a valve controlling the communication between each cylinder and the continuous pipe line, and means for adjusting said valves in unison, the outer portion of each of the pistons being provided with a chamber having communicating ports extending through a side wall of the cylinder, and an outwardly opening valve associated with the outer wall of the chamber.

3. A hydraulic transmission mechanism comprising a tubular member, means for supporting the same for rotation, a driving means therefor, shafts extending within said tubular member through opposite ends thereof, said tubular member at a point intermediate the ends of each of the shafts being provided with a surrounding casing, cylinders radiating from said casing, pistons working in the cylinders, said shaft having a crank working in the casing, pitman operatively connecting the pistons with the crank, a continuous pipe line in communication with each of the cylinders in advance of the pistons, a valve controlling the communication between each cylinder and the continuous pipe line, and means for adjusting said valves in unison.

4. A hydraulic transmission mechanism comprising an elongated tubular member supported for rotation, means for driving the same, shafts rotatably supported within the opposite end portions of the tubular member, said shafts and tubular member being independently rotatable one with respect to the other, the tubular member having casings at each end surrounding the shafts, cylinders carried by each of the casings, pistons working within the cylinders, operative connections between the pistons and the shafts, a continuous pipe line for the cylinders carried by each casing and in communication with said cylinders outwardly of the pistons, valves for controlling the communications between each of the continuous pipe lines and associated cylinders, means for operating the valves in unison, and means for operating the valves of one cylinder independently of the valves of the other cylinder.

5. A hydraulic transmission mechanism comprising an elongated tubular member supported for rotation, means for driving the same, shafts rotatably supported within the opposite end portions of the tubular member, said shafts and tubular member being independently rotatable one with respect to the other, the tubular member having casings surrounding the shafts, cylinders carried by the casings, pistons working within the cylinders, operative connections between the pistons and the shafts, a continuous pipe line for the cylinders carried by each casing and in communication with said cylinders outwardly of the pistons, valves for controlling the communications between each of the continuous pipe lines and associated cylinders, means for operating the valves in unison, a steering post, and an operative connection between the steering post and the valves for automatically adjusting the valves of one cylinder independently of the valves of the other cylinder upon rotation of the post.

6. A hydraulic transmission mechanism comprising a tubular member, a shaft extending therein, said tubular member having a casing surrounding said shaft, cylinders extending outwardly from the casing, pistons working within the cylinders, a continuous pipe line in communication with all of the cylinders outwardly of the pistons therein, rock valves for controlling the communications between the continuous pipe line and the cylinders, a collar mounted upon the tubular member for rotation therewith but having movement lengthwise thereof, means for moving the collar lengthwise of the tubular member, and operative connections between the collar cuff and the rock valves for adjusting said valves as the collar is moved lengthwise of the tubular member.

In testimony whereof I hereunto affix my signature.

AMILCARE GALANTI.